United States Patent
Bellwood et al.

(10) Patent No.: US 8,488,793 B2
(45) Date of Patent: Jul. 16, 2013

(54) EFFICIENT REBINDING OF PARTITIONED CONTENT ENCRYPTED USING BROADCAST ENCRYPTION

(75) Inventors: Thomas A. Bellwood, Austin, TX (US); Robert B. Chumbley, Round Rock, TX (US); Robert Glenn Deen, San Jose, CA (US); Matthew F. Rutkowski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 12/533,623

(22) Filed: Jul. 31, 2009

(65) Prior Publication Data
US 2011/0026713 A1 Feb. 3, 2011

(51) Int. Cl.
*H04L 9/00* (2006.01)

(52) U.S. Cl.
USPC ........... 380/277; 380/278; 380/279; 380/280; 380/281; 713/193; 726/30; 726/31; 726/32; 726/33

(58) Field of Classification Search
USPC ................. 380/277–281; 713/193; 726/30–33
See application file for complete search history.

(56) References Cited

U.S. PATENT DOCUMENTS

| | | | |
|---|---|---|---|
| 6,347,376 B1 | 2/2002 | Attwood et al. | |
| 6,505,192 B1 | 1/2003 | Godwin et al. | |
| 6,754,832 B1 | 6/2004 | Godwin et al. | |
| 7,424,613 B2 * | 9/2008 | Han et al. | 713/168 |
| 7,917,964 B2 * | 3/2011 | Takashima et al. | 726/30 |
| 7,979,913 B2 * | 7/2011 | Jang et al. | 726/29 |
| 2005/0071279 A1 | 3/2005 | Asano | |
| 2005/0120216 A1 * | 6/2005 | Lee et al. | 713/171 |
| 2006/0165233 A1 * | 7/2006 | Nonaka et al. | 380/44 |
| 2006/0262927 A1 | 11/2006 | Rutkowski et al. | |
| 2006/0265338 A1 | 11/2006 | Rutkowski et al. | |
| 2008/0313468 A1 * | 12/2008 | Yoshikawa | 713/182 |
| 2009/0327702 A1 * | 12/2009 | Schnell | 713/155 |

OTHER PUBLICATIONS

IBM, "IBM Response to DVB-CPT Call for Proposals for Content Protection & Copy Managment: xCP Cluster Protocol." DVB, Digital Video Broadcasting, Geneva, Switzerland, Oct. 17, 2003, FIGs. 1 and 2, pp. 6-15.
Intel Corporation, "Advance Access Content System (AACS—HD DVD Recordable Book," Retrieved from Internet: URL:http://web.archive.org/web/20060520185855/http://www.aacsla.com/specifications/, retrieved on May 21, 2001, Apr. 26, 2006, pp. 13-19.

(Continued)

*Primary Examiner* — April Y Blair
(74) *Attorney, Agent, or Firm* — John D. Flynn; Gregory K Goshorn; Greg Goshorn, P.C.

(57) ABSTRACT

Provided is a method for rendering media content wherein a request to render a first media content stored in a first partition is received, wherein the first partition stores the first and a second media content; the media content is correlated to a first management key block (MKB), binding ID (IDb) and authorization table (AT); the first MKB, IDb and AT are compared to a current MKB, IDb and AT; and if any of the first MKB, IDb or AT do not correspond to the current MKB, IDb or AT, respectively, generating a second partition by rebinding the first media content with respect to the current MKB, IDb and AT to generate a title key; and associating the first media content, the current MKB, IDb, AT and title key with the second partition, wherein the second media content remains associated with the first MKB, IDb, AT and partition.

23 Claims, 8 Drawing Sheets

OTHER PUBLICATIONS

Intel Corporation, "Content Protection for Recordable Media Specification: DVD Book, Revision 0.94," Retrieved from Internet: URL:http://www.4dentity.com/4centity/tech/cprm/, retrieved on May 21, 2001, Oct. 18, 2000, pp. 31-36.

Nternational Searching Authority; PCT International Search Report and Written Opinion; Nov. 19, 2010.

Grimm et al.; "Privacy Protection for Signed Media Files: A Separation-of-Duty Approach to the Lightweight DRM (LWDRM) System;" ACM Digital Library; pp. 93-99, Magdeburg, Germany; © 2004.

\* cited by examiner

EFFICIENT REBINDING OF PARTITIONED CONTENT ENCRYPTED USING BROADCAST ENCRYPTION

FIELD OF DISCLOSURE

The claimed subject matter relates generally to the processing of digital content and, more specifically, to an efficient method for rendering encrypted digital content.

SUMMARY

As computers and media devices have become increasingly connected via networks and the Internet, the amount of content transmitted among these devices has grown in proportion to the size of the communication channels, or the bandwidth. Once used primarily for electronic mail, or email, and small file transfers, networks such as networks in general and the Internet specifically are increasingly relied upon by content providers to distribute high quality content such as movies and music recordings.

Content providers that distribute such high quality content face correspondingly increased production costs. To control security and restrict access to material, content is sometimes protected by encryption, digital rights management (DRM) systems or conditional access (CA) systems.

A recent development in the field of encryption of digital data and communication is broadcast encryption. Broadcast encryption is based upon a management key block (MKB), which is a block of cryptographic key data which can be used in conjunction with a set of Device Keys ($K_d$) on a receiving device (e.g. player, renderer etc.) to derive one or more Management Keys (Km). These Management Keys can be used to (directly or indirectly) decrypt one or more content keys, which in turn can be used to decrypt content. Although for the purposes of the following examples, only a single title key is used, the claimed technology is also applicable to systems that employ multiple title keys. For example, some MKB configurations employ title key blocks in which different devices are potentially assigned to different security classes and derive a particular title key that corresponds to the assigned security class.

The term Content Key can be used to mean a simple Title Key ($K_t$), sets of Title Keys (for the same piece of content), Volume Keys, Sector Keys or Disk Keys. Large blocks of content may be divided into volumes, sectors or disks, each of which with a separate title key. For example, high definition video content may be divided into sectors that correspond to a progression of title keys that change either on a sector-by-sector basis or periodically during the course of a linear broadcast of the content. The MKB can be delivered concurrent with the content, for example at the beginning of a linear broadcast, or obtained "out-of-band" from a broadcast or internet service, from other devices that are part of the same key space or placed on physical media in the case of prerecorded and recordable content. One of the largest advantages to broadcast encryption is that two devices, which might be previously unknown to each other, can agree upon a key over a one-way communication path. This advantage makes broadcast encryption ideal for the communication between two security system components. Another advantage is that broadcast encryption requires two or three orders of magnitude less overhead in the corresponding device than most other systems, thus lowering the cost of the devices for manufacturers and consumers.

Devices that implement the broadcast encryption mechanisms are said to "bind" the content they protect to a particular entity (e.g. a home network or cluster) by encrypting the content with a different key, called the binding key (Kb), than the one produced by processing a MKB, as explained below. All current approaches to binding a piece of content to a particular entity, regardless of whether it is a piece of media, a device, or a user, is through one level of indirection in the calculation of the encryption keys. In these cases, the procedure to encrypt a piece of content is roughly the following:

1. Extract a Management Key (Km) by processing the MKB.
2. Perform a one-way function to a piece of data that uniquely identifies the entity this content is being bound to (or the "IDb"), using Km and resulting in a binding key (i.e. Kb=G(Km, IDb)). In the case of cluster or network binding, IDb represents a unique network identifier.
3. Select a title key (Kt), which may be either random or predetermined, for this piece of content and encrypt it using Kb, resulting in an encrypted title key (EKt) (i.e. EKt=E(Kb, Kt)).
4. The content is encrypted with the Kt and then the encrypted content is stored in conjunction with the EKt.
5. If the MKB supports multiple security classes, repeat steps 1-4 for each Management Key at the desired security class to create a set of title keys. Implementations may choose to use the same set of title keys to protect a logical volume of content or all or portions of a disk of content.

Once the procedure has been implemented, any compliant device that has access to the same MKB, IDb and EKt can decrypt a communication or content by reproducing the same Kb and decrypting Kt.

In a further development, the broadcast encryption system has been extended to enable groups, domains or "clusters," of devices to be collected into secure authorized logical networks. In a particular cluster, the list of authorized devices is represented in an entity called an authorization table (AT). If a device's authorization state is changed (e.g. a new device is authorized, a device is suspended or deleted from the cluster), the AT is updated to reflect the change. The Authorization Table, in such a scheme, would be a component of the Binding Key; therefore, when it is updated any data encrypted by the Binding Key (e.g. Title Keys) would in turn need to be re-encrypted. As devices change "clusters" or networks (e.g. from sale or purchases) the IDb may also change, again causing a need for the binding key to be updated and hence all content keys.

As the Inventors herein have recognized, there are issues that remain with current broadcast encryption schemes. Key elements in the binding scheme include the MKB and an AT. Each time the MKB or AT changes, each device must propagate that change to all other devices in the device's "cluster" and in turn rebind all title keys that are managed. In existing applications of broadcast encryption, the frequency of update to the MKB is relatively static (being conveyed on physical media and/or manufactured devices) and hence revocation of devices is in turn less frequent. However, in a cluster of devices which can be networked and connected to the Internet, a new MKB may be propagated much more frequently and accompany digital content provided via an Internet service.

As the Inventors herein have recognized, in various binding scenarios there is more than one piece of content that is bound to the same entity and, at the same time, either the MKB, IDb or AT can change. The result of this is that the value of Kb changes and thus all the existing title keys need to be re-encrypted with the new value of Kb—otherwise, no device would be able to open the content again. It should be noted that encrypted content of this nature is routinely exchanged and/or copied between entities that participate in the described binding scheme.

The claimed technology provides a system and method for the creation of partitions content and/or their respective content keys (e.g. Title Keys, Title Key Sets, Volume Keys, etc.) where each partition reflects a different binding of the content key. In this embodiment the binding key reflects the particular IDbs, MKBs, and ATs used in the calculation at a particular point in time. As explained above, in a particular situation, either the MKB, IDb or the AT may be updated. Rather than processing every piece of content a particular device may have access to (via local or network storage), only content that is requested for rendering is processed. If content is requested, an Ekt corresponding to the content is retrieved and correlated to a particular partition. The MKB, IDb and AT of the partition are examined to determine whether or not they match the current "state" of the system, i.e. the most current versions of the MKB, IDb and AT. If so, the content is decrypted and rendered. If not, the content is rebound into another partition, either already existing or newly created, the old partition is updated to remove the content and the content is decrypted and rendered. To improve processing speed, the disclosed technology may be executed on portions of content as required.

Periodically, all content may be incorporated into the most current partition. In addition, the disclosed technology provides for intelligent processing of content such that, once a particular content is requested, related content may also be preemptively processed according to the disclosed techniques. It should be noted that the content itself never requires re-encryption as its respective content key never is altered; however, the encryption of the content key itself changes as the Binding Key (Kb) and its components change.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
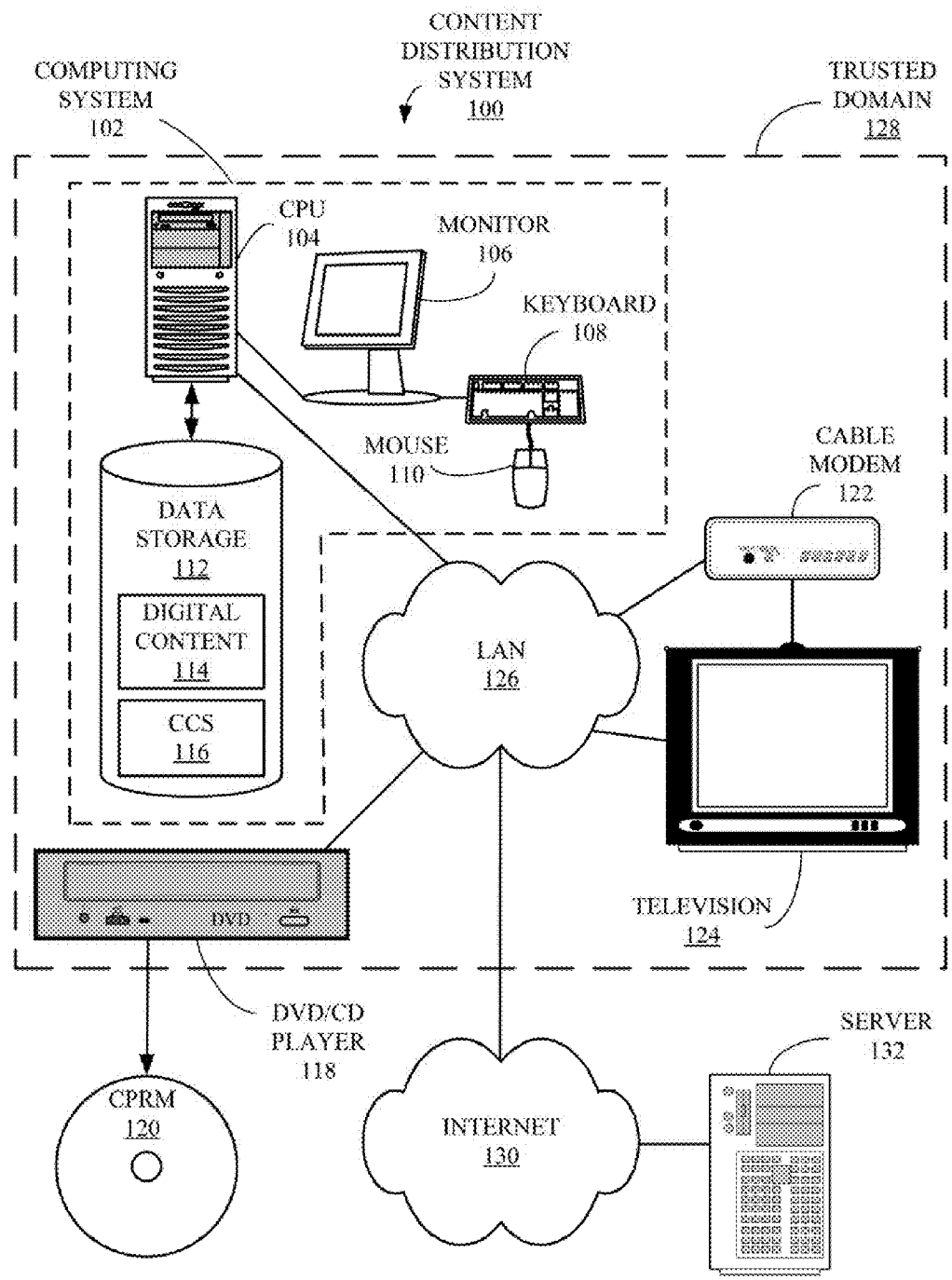
FIG. 1 is a block diagram of one example of a media delivery architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One embodiment, in accordance with the claimed subject, is directed to a programmed method for media content control. The term "programmed method", as used herein, is defined to mean one or more process steps that are presently performed; or, alternatively, one or more process steps that are enabled to be performed at a future point in time. The term 'programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, solid state connection such as a flash memory or USB connection, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the figures, FIG. 1 is a block diagram of one example of a media delivery architecture, or content distribution system, 100 that may implement the claimed subject matter. A computing system 102 includes a central processing unit (CPU) 104, which is coupled to a monitor 106, a keyboard 108 and a mouse 110. Monitor 106, keyboard 108 and mouse 110 facilitate human interaction with computing system 102. Attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown). Data storage 112 is illustrated storing exemplary digital content 114, which is described in more detail below in conjunction with FIGS. 3-8. It should be noted that although digital content 114 is described as digital data, there is no requirement that content protected by the claimed subject matter be digital in nature. The claimed subject matter is equally applicable to analog content. Digital content 114 is used merely as an example for the purposes of illustration. Stored on data storage is a content control system (CCS) 116 that is one example of an implementation of the claimed subject matter. CCS 116 is described in more detail below in conjunction with FIGS. 2-8. It should be noted that CCS 116 is shown installed on client system 102 for the purpose of the following description but could also be installed on any media delivery device, such as, but not limited to, a digital video device/compact disk (DVD/CD) player 118, a television 124 and a cable modem 128. CCS 116 may also stored by network accessible (or attached) storage devices, i.e. stored in a remote Internet account but accessible by the network. CCS 116 may also be comprised of many different storage devices and locations but made to appear as one logical system via file system software (e.g. network file system or grid file system).

Computing system 102 is part of an authorized, or trusted, domain 128 of devices. In general, an authorized or trusted domain is a group of devices that adhere to the standards of the claimed subject matter and are able to freely share digital content that is authorized for use by any one of them and in which the authorization has not been revoked. Trusted domain 128, in this example, may also include DVD/CD player 118, cable modem 122, television 124 and flash memory (not shown). Devices 102, 118, 122 and 124 are used merely as examples of types of devices that might be included in an authorized or trusted domain such as domain 128. Those with skill in the arts should appreciate that are many types of devices, such as, but not limited to, a digital video recorders (DVR), set-top box (STB), personal computer (PC), book reader, portable drives, mobile phones, and so on, that would benefit form the ability to freely share digital content that is otherwise protected from devices outside of a trusted domain.

Devices 102, 118, 122 and 124 of trusted domain 128 are communicatively coupled via a local area network (LAN) 126. Of course, there are many options for coupling such devices including direct connections, wireless connections and even over multiple interconnected LANs (not shown), a metro area network (MAN) or a wide area network (WAN). In addition, there could be devices (not shown) coupled to LAN 126 or any of devices 102, 118, 122 or 124 that are not included in trusted domain 128. A disk 120 implementing, in this example, Content Protection for Recordable Media (CPRM) is produced by DVD/CD player 118 or, for example, a set-top box (STB) (not shown) and a high definition DVD player. CPRM is also applicable to streamed media content. In addition to CPRM, other examples of content protection schemes include Secure Digital (SD) cards and Content Protection for Extended Media (CPXM). Disk 120 may include information for implementing the claimed subject matter. It should be noted that CPRM disk 120 is used merely as an example of one of multiple possible content protection schemes. One other example is the Advanced Access Content System (AACS) developed by a consortium including IBM and other companies.

LAN 126 is coupled to the Internet 130, which is communicatively coupled to a server 132. In the following description, server 132 is used as an example of a source of downloaded digital content. Although in this example, computing system 102 and server 132 are communicatively coupled via LAN 126 and the Internet 130, they could also be coupled through any number of communication mediums such as, but not limited to, a direct wire or wireless connection. Further, server 132 could be linked directly to LAN 126 and could be either included in trusted domain 128 or not. In this example, server 132 is not part of trusted domain 128.

Figure 2:
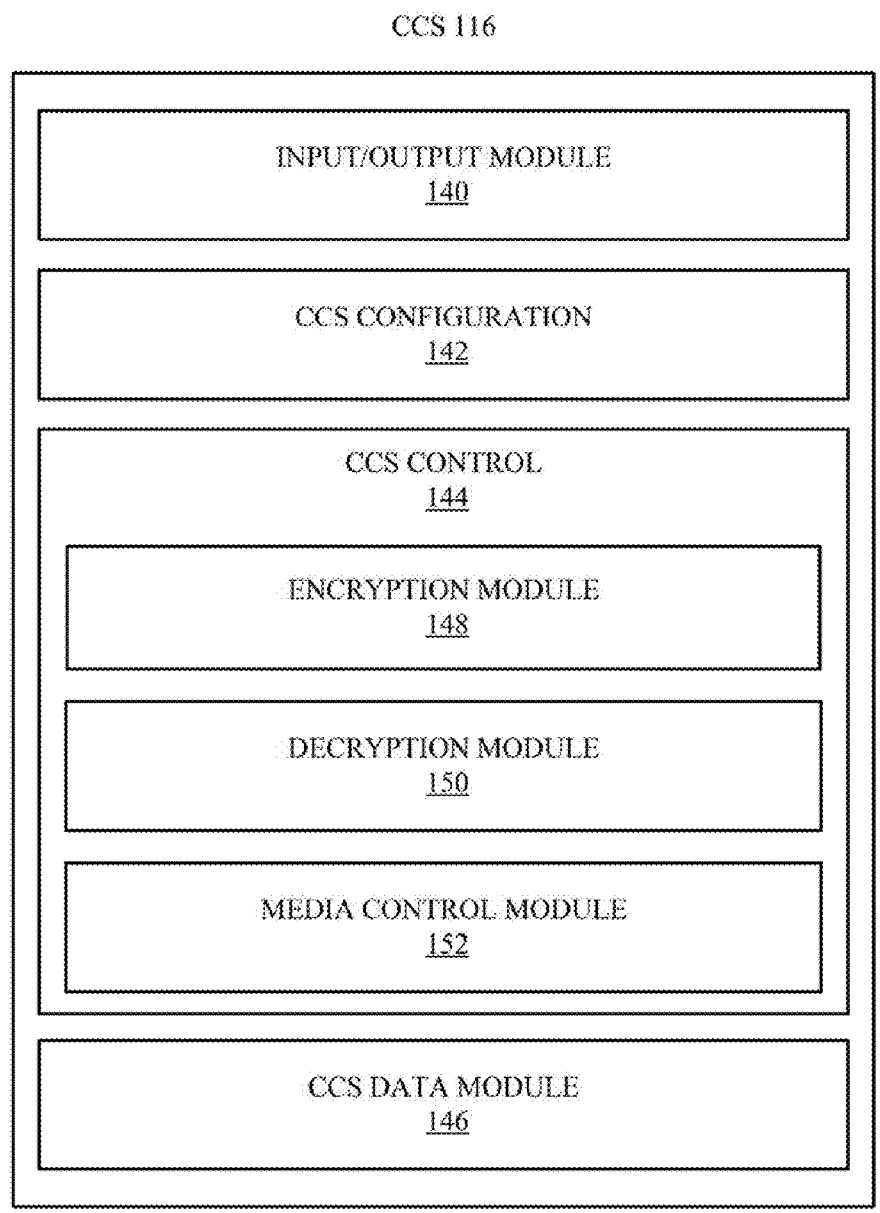
FIG. 2 is a block diagram of a media control device (MCD) that may implement the disclosed technology.

FIG. 2 is a block diagram of content control system (CCS) 116, first introduced in conjunction with FIG. 1, in more detail. In this example, CCS 116 is stored on data storage 112 (FIG. 1) and executed on CPU, or processor, 104 (FIG. 1) of computing system 102 (FIG. 1). Of course, CCS 112 could also be stored and executed on another computing system (not shown) or any media delivery device such as, but not limited to, DVD/CD player 118 (FIG. 1), cable modem 122 (FIG. 1) and a Set-top Box (STB) (not shown). In fact, the disclosed techniques may be implemented on any device that is configured to control access to media content. CCS 116 includes an input/output (I/O) module 140, a CCS Configuration module 142, a CCS Control module 144 and a CCS data cache component 146. It should be understood that the representation of CCS 116 in FIG. 2 is a logical model. In other words, components 140, 142, 144, 146 and other components described below may be stored in the same or separate files and loaded and/or executed within system 100 either as a single system or as separate processes interacting via any available inter process communication (IPC) techniques.

I/O module 140 handles communication CCS 116 has with other components of computing system 102 and system 100. CCS configuration module 142 stores parameters defined by an administrator to control the setup and operation of CCS 116. Examples of such configuration parameters include, but are not limited to, security settings, display options and so on. In addition, parameters may be defined that list potential users, applications and computing hosts and corresponding levels of security and specific implementations of the claimed technology.

In addition, MCM 118 may track user playlists, usage data, and so on and use the collected data to determine a "schedule" for rebinding of content keys based upon a predetermined or user controlled weighting system. Also, CCS 116 may defer rebinding to a time when CCS 116 is not actively processing (decrypting) video data (low CPU 104 utilization for example) and batch process partitions at that low-utilization time period.

CCS data cache 146 is a data repository for information, including settings and other information that CCS 116 requires during operation. Examples of the types of information stored in cache 146 include, but are not limited to, specific commands employed in conjunction with modules 148 and 150, corresponding patterns associated with the processing of module 152, with each action correlated with a particular acceptable action based upon the patterns, and a list of computing systems of resources that are configured to employ CCS 116 to control access. In addition, cache 146 may store intermediate results associated with the processing of CCS 116. Processing associated with elements 116, 140, 142, 144, 146, 148, 150 and 152 are described in more detail below in conjunction with FIGS. 3-8.

Figure 3:
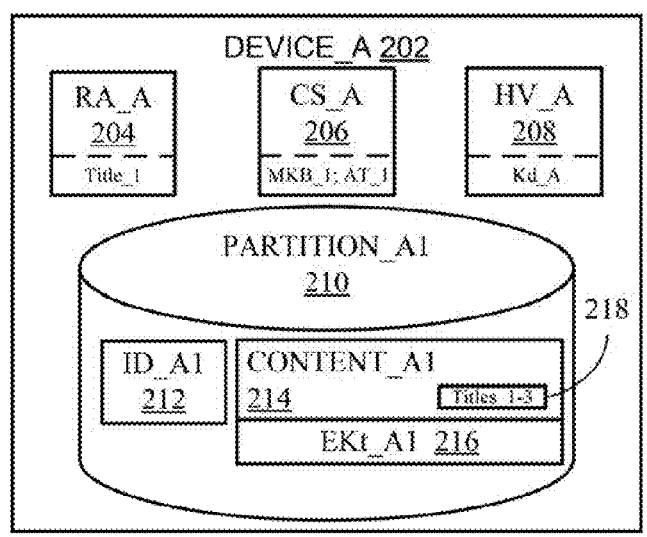
FIG. 3 is a block diagram showing an example of logical configuration of a first device that incorporates the claimed subject matter.

FIG. 3 is a block diagram showing an example of logical configuration of a first device, i.e., a Device_A 202, that incorporates the claimed subject matter. Device_A 202 includes a rendering application, RA_A 204, a current state, CS_A 206, and a hardware vault, HV_A 208. RA_A 204 is a device that plays, or renders, a selection of digital content. For example, RA_A 204 may be, but is not limited to, logic associated with a DVD player, a DVR device or a CD player. With respect to FIG. 3, RA_A 204 is illustrated as in the process of being requested to render a particular content, or "Title_1." CS_A 206 is a memory location that stores the current state of the device with respect to the claimed subject matter. In the following examples, CS_A 206 stores a version number of the most recent Management Key Block (MKB), Authentication Table (AT) and Binding ID (IDb), although for the purposes of the following examples the binding key remains fixed. With respect to FIG. 3, CS_A 206 is illustrated storing a first version of a MKB, or "MKB_1," and a first version of an AT, or "AT_1." HV_A 208 stores keys corresponding to difference devices. With respect to FIG. 3, HV_A 208 is illustrated storing hardware keys corresponding to Device_A 202, or "Kd_A."

Device_A 202 includes a storage device, i.e. a Partition_A1 210, that stores an ID related to the state of any content stored on partition_A1 210, or ID_A1 212, and digital content, i.e. or content_A1 214. In this example, content_A1 stores three distinct files of digital content, i.e. "Title_1," "Title_2" and "Title_3," which are collectively labeled titles_1-3 218. Content_A1 214 is stored in conjunction with a set of encrypted title keys, i.e. EKt_A1 216, in which each encrypted title of titles 218 has a unique title key, or Ekt. In other words, in this example, EKt1_A1 216 represents three title keys, i.e. 1-3, corresponding to the 3 separate files of digital contents 218. EKt_A1 216 is associated with partition_A1 210, which logically groups content_A1 214 bound by MKB_A1 and AT_A1 of CS_A1 206 by fast comparison against their respective hash values, which may logically combined or perhaps concatenated. If a user requests Title_1 of titles 218 for rendering by RA_A 204, device A 202 retrieves corresponding encrypted title key for title_1 from EKt_A1 216 of content_A1 214. Since in this example, the MKB, MKB_1, and the AT, AT_1, of partition_A1 210 match information stored in CS_A B 206, rebinding of content_A1 214 with a new encrypted title key is not necessary and title_1 of content_A1 214 is decrypted using the corresponding title key of EKt_A1 126 and rendered by RA_A 204.

Figure 4:
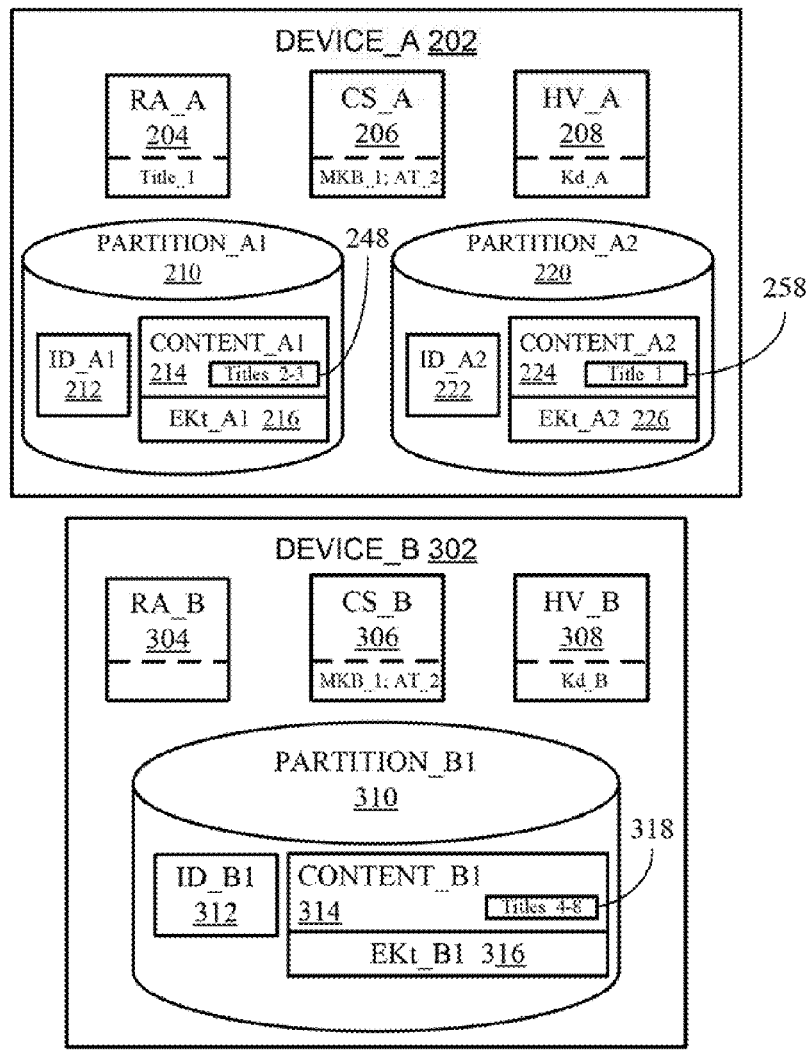
FIG. 4 is a block diagram showing a logical configuration of the first device of FIG. 3 and a second device such that the first and second devices constitute a cluster.

FIG. 4 is a block diagram showing device_A 202 (FIG. 3) and a second device, or device_B 302, such that device_A 202 and device_B 302 constitute a cluster. Device_A 202 includes the components illustrated in FIG. 3 and device_B 302 includes corresponding components having similar functions and hierarchy, i.e. a rendering application, or RA_B 304, a current state CS, or CS_B 306, a hardware vault, or HV_B 308, a storage partition, or partition_B1 310, an ID, or ID_B1 312, a content section, or content_B1 314 and storage for encrypted title keys for titles in content_B1 314, or a EKt_B1 316. In other words, device_B 302 has joined the "cluster" that includes device_A 202. In this example, content_B1 314 is storing five files of digital content, collectively labeled Titles_4-8 318.

As a result of a modified cluster, a new AT must be generated, thereby changing the contents of CS_A 206 from "MKB_1; AT_1" to "MKB_1; AT_2." In accordance with the claimed subject matter, MKB_1 is unchanged and device_A 202 defers rebinding content_A1 214 by choosing not to update the binding information used on EKt_A1 216 at this time. Subsequently if a request is received at device_A 202 for the rendering of title_1, which is currently stored in content_A1 214, the corresponding title key is retrieved from EKt_A1 216. In this example, the retrieved title key is associated with partition_A1 210 and logically groups content bound by MKB_1 and AT_1. Since the contents of the MKB and AT of partition_1 210 as indicated by ID_A1 212, do not match the current state as indicated by CS_A 206 (which indicates AT_1 is now AT_2), device_A 202 chooses to rebind EKt1 only with respect to title_1 and move title_1 from Partition_A1 210 to a new partition_A2 220 which is logically identified by MKB1 and AT2 hash, both with respect to a new ID, an ID_A2 222, and a new title key stored in EKt_A2 226.

It should be noted that, in a cluster, one device, such as device_B 302, may request a title from another device, such as device_A 202. In that case, the creation of a new partition and a rebinding of a particular title would be initiated by device_A 202, as described above. It should also be noted that content_A1 214 now only includes title_2 and title_3, which are collectively labeled titles_2-3 248. In addition, Ekt_A1 216 only contains EKts for titles 1 and 2. As stated above, title_1 and the its respective EKt are now stored in conjunction with a content_A2 224 of partition_A2 220 as title_1 258 and the tiel key in included in EKt_A2 226. Device_A 202 may defer rebinding the remainder of title keys 216 in partition_A1 210 to a later time to speed processing of the rendering of title_1. Once title_1 has been rebound, RA_A 204 may render the content because the new MKB and AT associated with EKt_A2 226 agree with the information stored in CS_A 206.

Figure 5:
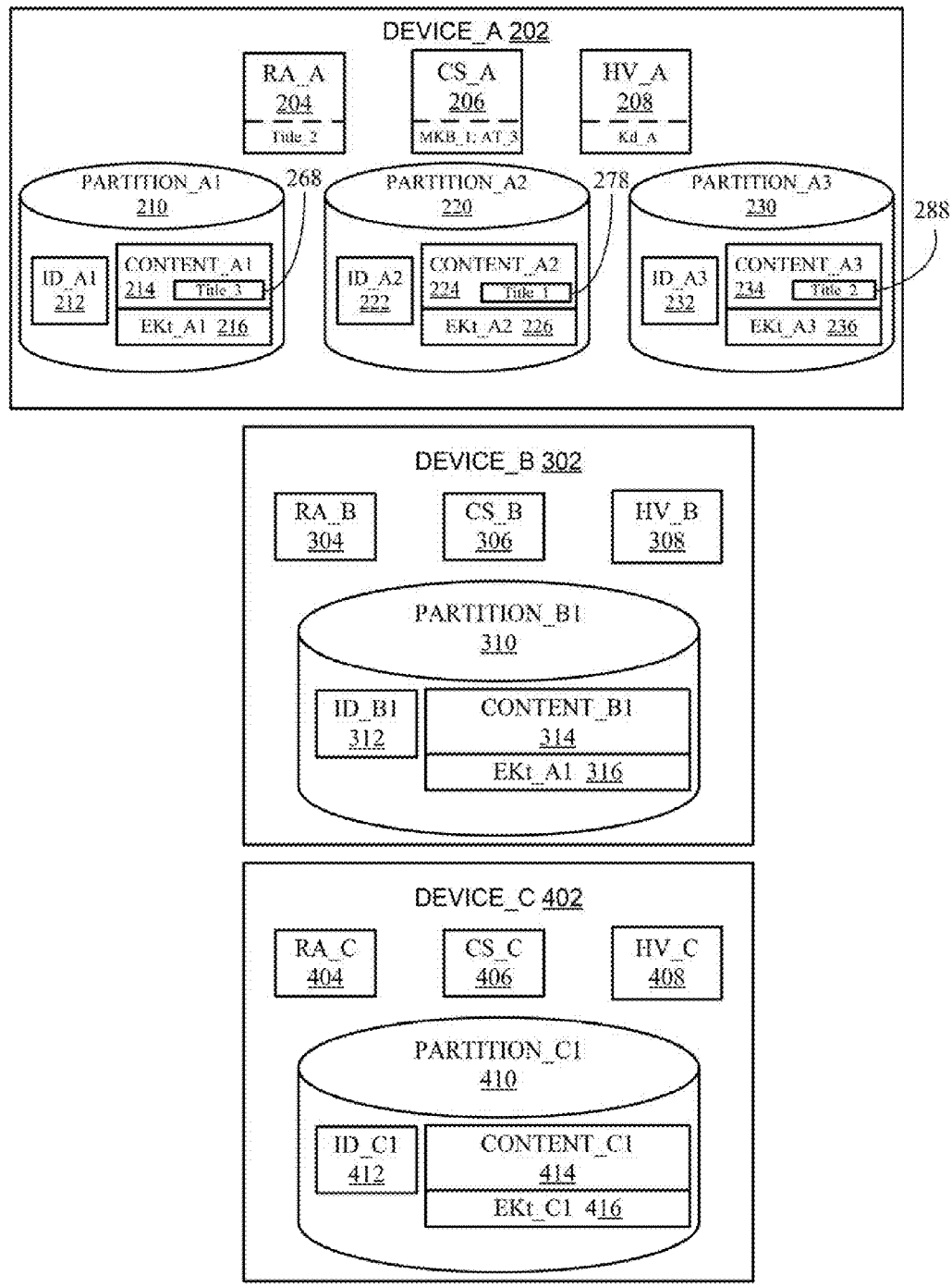
FIG. 5 is a block diagram showing a logical configuration of the first and second devices of FIGS. 3 and 4 and a third device such that the first, second and third devices constitute a cluster.

FIG. 5 is a block diagram showing device_A 202 (FIGS. 3 and 4), device_B 302 (FIG. 4) and a third device, or device_C 402, such that device_A 202, device_B 302 and device_C 402 constitute a cluster. Device_A 202 includes the components illustrated in FIGS. 3 and 4, device_B 302 includes the components illustrated in FIG. 4 and device_C 402 includes corresponding components having similar functions and hierarchy, i.e. a rendering application, or RA_C 404, a current state CS, or CS_C 406, a hardware vault, or HV_C 408, a storage partition, or partition_C1 410, an ID, or ID_C1 412, a content section, or content_C1 414 and storage for encrypted title keys for titles in content_C1 414, or a EKt_C1 416. In other words, device_C 402 has joined the "cluster" that includes device_A 202 and device_B 302. It should be noted that process and logic described with respect to device_A 202 and rendering applications, partitions, states, content and keys are equally applicable to device_B 302 and device_C 402.

As a result of a modified cluster, a new AT must be generated, thereby changing the contents of CS_A 206 from "MKB_1; AT_2" to "MKB_1; AT_3." In accordance with the claimed subject matter, MKB_1 is unchanged and device_A 202 defers rebinding content_A1 214 by choosing not to update binding information used on EKt_A1 216. If a user on device_A 202 requests title_2, which is still associated with partition_A1 210, device_A 202 retrieves corresponding encrypted title key EKt_A1 216, which logically groups content bound by MKB1 and AT1. Since the MKB and AT associated with partition_A1 210 and EKt_A1 216 do not match the current state of device_A 202 as indicated by CS_A 206, device_A 202 rebinds EKt_A1 216 only with respect to title_2 and moves title_2 to a content_A3 234 on a partition_A3 230 and generates a new ID, ID_A3 232, and a new encrypted title key that is stored in EKt_A3 236. Device_A 202 defers rebinding the remainder of title key in partition_A1 210 to a later time to save processor for rendering of content (i.e. title_2). Once title_2 has been rebound, RA_A 204 may render the content because the new MKB and AT associated with EKt_A3 236 agree with the information stored in CS_A 206.

Figure 6:
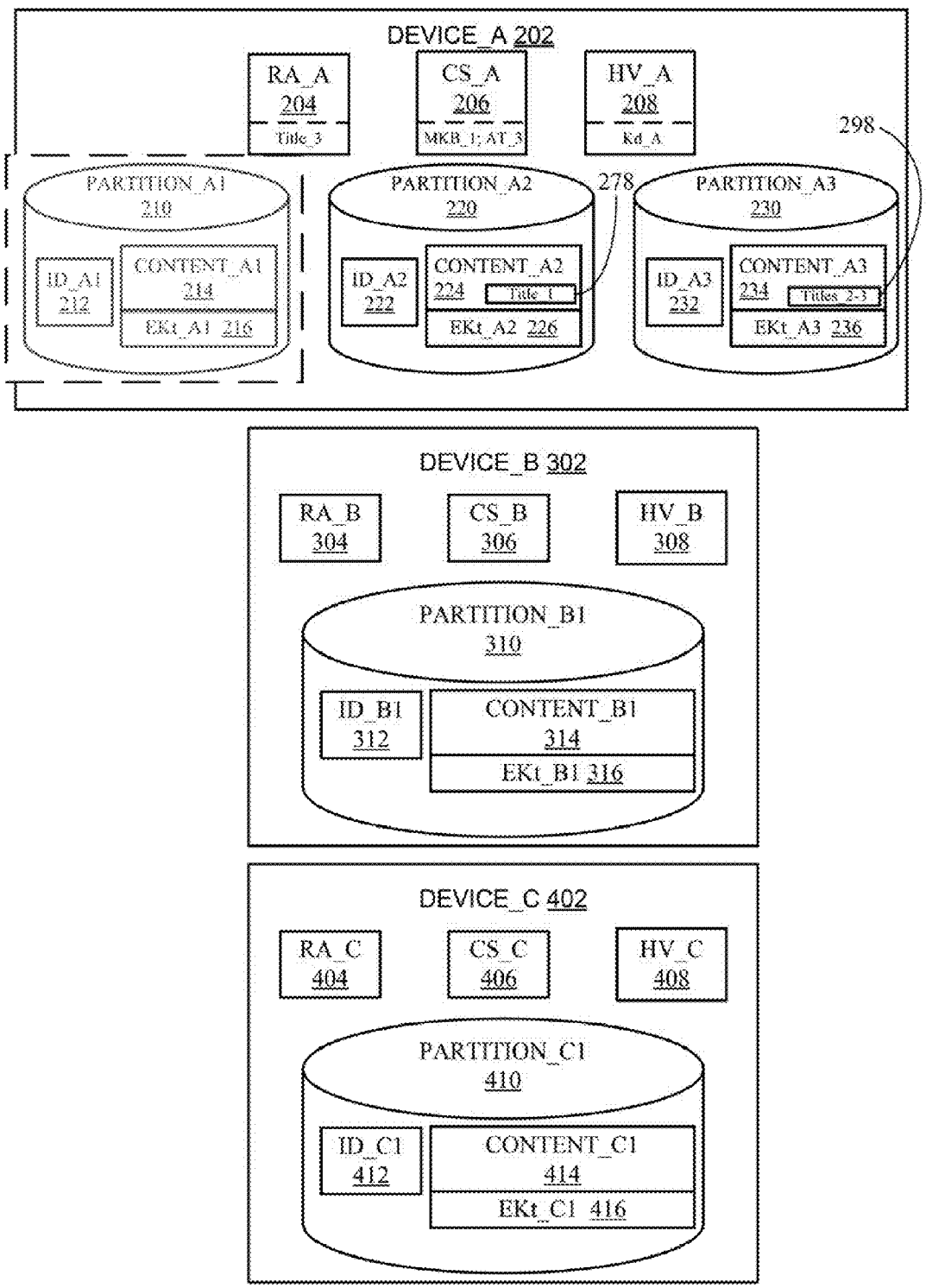
FIG. 6 is a block diagram showing the first, second and third devices of FIGS. 3-5 once a particular partition has become outdated.

FIG. 6 is a block diagram showing device_A 202 (FIGS. 3-5), device_B 302 (FIGS. 4 and 5) and device_C 402 (FIG. 5) following a request to render title_3, which was the only remaining title in partition_A1 210 in the illustration of FIG. 5, on device_A 202. In that case, the creation of a new partition and a rebinding of a particular title would be initiated by device_A 202, as described above. As mentioned above, a request to render a title on one device, may initiated the creation of a new partition and a rebinding on another device on which the title is stored. The corresponding title key is retrieved from EKt_A 216, which is associated with partition_A1 210 and logically groups content bound by MKB_1 and AT_1. Since the contents of the MKB and AT of partition_1 210 as indicated by ID_A1 212, do not match the current state as indicated by CS_A 206, device_A 202 chooses to rebind EKt1 with respect to title_3 and move title_3 from Partition_A1 210 to a partition_A3 230 which is logically identified by MKB1 and AT3 hash, which are both identified as the most current versions within the current network/system configuration, both with respect to a new ID, an ID_A3 234, and a new title key stored in EKt_A3 232.

If should be noted that partition_A1 210 no longer stores any content and has therefore become unnecessary. Therefore, both a dotted line surrounding partition_A1 210 and the fact that partition_A1 210 is rendered with faded or "grayed out," lines indicates that partition_A1 210 is now deleted from data storage 112. Partition_A2 220 stores title_1 278 and partition_A3 230 now stores titles 2 and 3, collectively labeled titles_2-3 298. Once title_3 has been rebound, RA_A 204 may render the content because the new MKB and AT associated with EKt_A3 236 agree with the information stored in CS_A 206.

Figure 7:
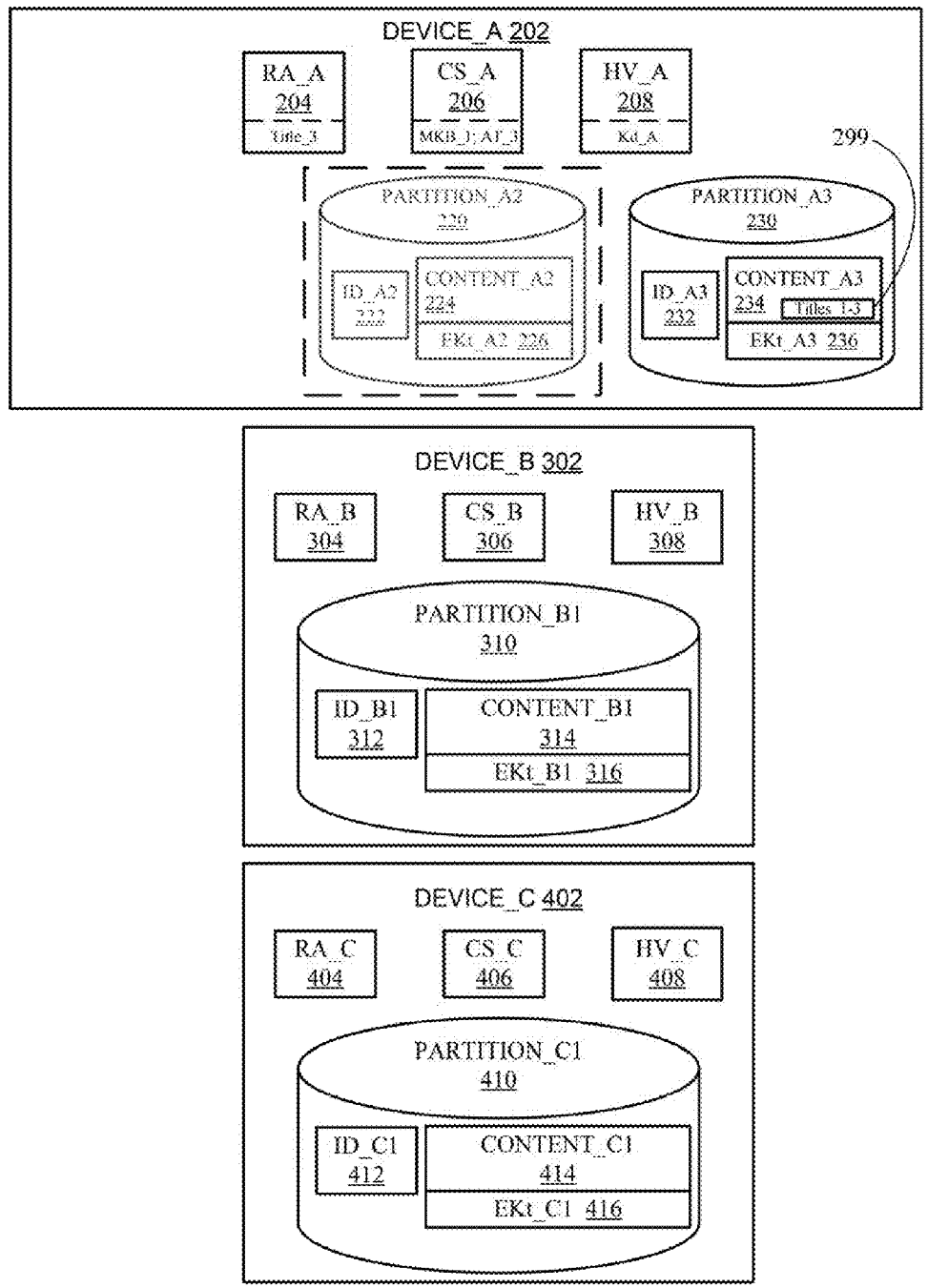
FIG. 7 is a block diagram showing the first, second and third devices of FIGS. 3-6 once a second partition has become outdated.

FIG. 7 is a block diagram showing the first, second and third devices of FIGS. 3-6 once a second partition, i.e. partition_A2 220, has become outdated or necessary. In this example, rather than a transfer of tile_1 278 from partition_A2 220 to partition_A3 230 because of a request to render title_1, as in previous examples, MCM 152 (FIG. 2) of CCS 116 has determined that tile_1 is either typically rendered after title_2 or in conjunction with title_2 and, therefore, CCS 116 anticipates the rendering of title_1 and automatically executes the transfer to partition_A3 230. In this manner, title_1 is available for rendering immediately when requested as indicated by the storage of titles_1-3 299 on partition_A3 230. Like FIG. 6, a dotted line and a grayed-out partition, i.e. partition_A2 220, indicate that partition_A2 220 is deleted from data storage 112. It should be noted that devices may choose to update partitions under their control not simply as the result of the processing of a content request but also at other times based upon user and administrative preferences.

Figure 8:
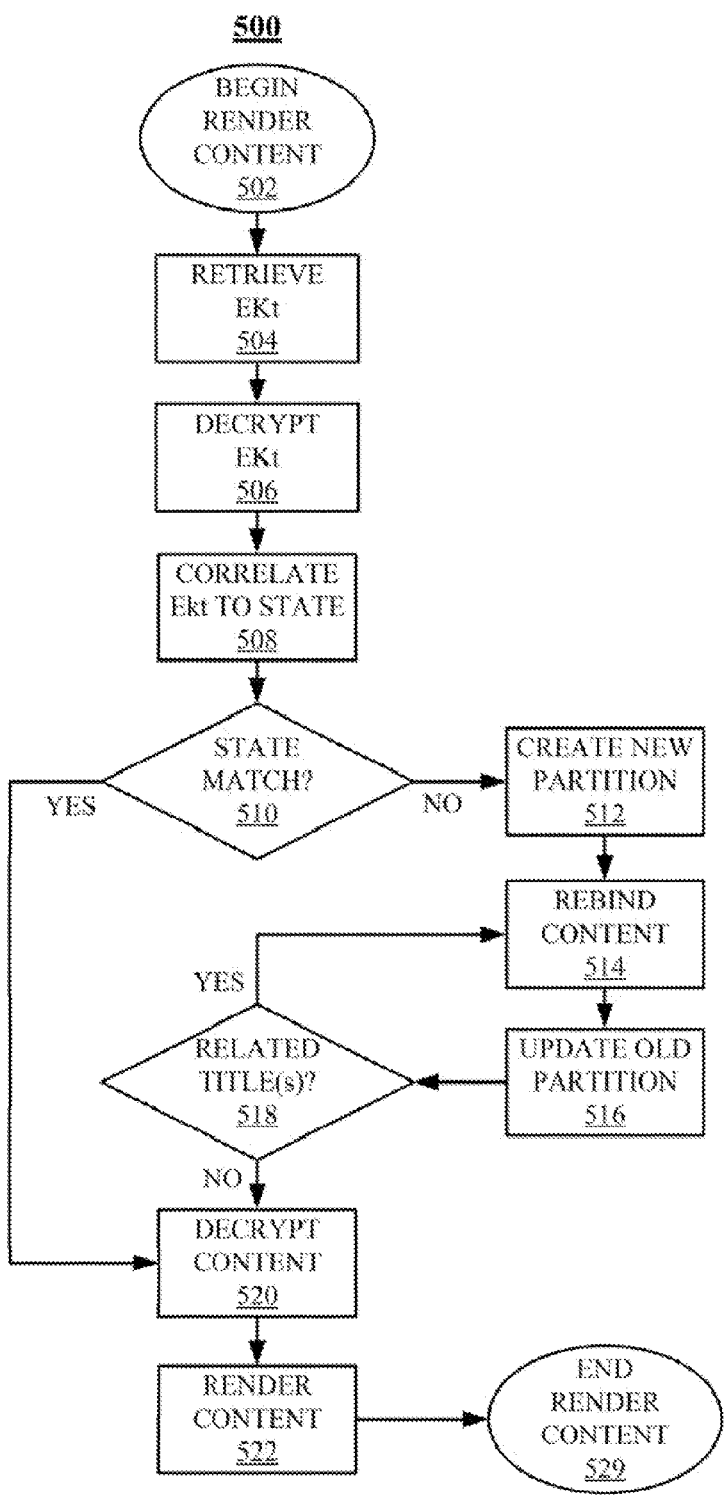
FIG. 8 is a flowchart illustrating one example of processing associated with the rendering of content in conjunction with the device cluster of FIGS. 3-7.

FIG. 8 is a flowchart illustrating one example of a Render Content process 500 associated with the device cluster of FIGS. 3-7 in accordance with the claimed subject matter. In this example, logic associated with process 500 is stored on data storage 112 (FIG. 1) as part of CCS 116 (FIGS. 1 and 2) and executed on CPU, or processor, 104 of computing system 102. In the alternative, process 500, as well as CCS 116 may be executed on any media delivery device or on a server such as server 132 that controls access to media content.

Process 500 starts in a "Begin Render Content" block 502 and proceeds immediately to a Retrieve EKt" block 504. During block 504, process 500, in response to a request to render a particular content, retrieves from Ekt_A1 216 (FIGS. 3-7) the encrypted title key that corresponds to the requested content. In this example, the requested title is "title_1" (FIGS. 3-7), the device on which the rendering is to be executed is device_A 202 (FIGS. 3-7). As noted above, the request to render a title may also come from a different device in the cluster of device_A 202. During a "Dycrypt EKt" block 506 the EKT retrieved during block 504 is decrypted using the hardware key HV_A 208 (FIGS. 3-7) to determine the MKB and AT to which the media corresponds. During a "Correlate Ekt to State" block, process compared the MKB and AT corresponding to the selected media with the MKB and AT of device_A 508, i.e. the current state of device_A 508 as stored in CS_A 206 (FIGS. 3-7).

During a "State Match?" block 510, process 500 determines whether or not the MKB and AT corresponding to the selected media corresponds to the MKB and AT as stored in CS_A 206. If not, i.e. either the most current MKB and/or AT have been updated since title_1 has been stored in content_A1 214 (FIGS. 3-7), process 500 proceeds to a "Create New Partition" block 512. During block 512, process 500 generates a new storage partition, which in this example is partition_A2 220 (FIGS. 4-7). During a "Rebind Content" block 514, a new encrypted title key is generated for the selected media based upon the most current MKB and AT. The requested content is then stored in content_A2 224 (FIGS. 4-7) and the new Ekt is stored in Ekt_A2 226 (FIGS. 4-7).

During an "Update Old Partition" block 516, the selected media is deleted from content_A1 214 of partition_A1 210 and the outdated Ekt is deleted form Ekt_A1 216. Updating partition_A1 210 also implies that the memory associated with partition_A1 210 is released if the content that has been moved is the only remaining content that was stored on partition_A1 210. During a "Related Title(s)?" block 518, process 500 determines whether or not there are other titles that may be associated with title_1. For example, title_2 may typically be rendered after or in conjunction with title_1. If there are one or more related titles, control returns to block 514 during which the additional titles are processed to rebind the titles to the most current MKB and AT, stored in the partition created during block 512 and the old partition is updated accordingly.

Once all related titles located during block 518 have been processed through blocks 512, 514 and 516 or process 500 has determined during block 510 that the current state of device_A 202 and the selected title match, control proceeds to a "Decrypt Content" block 520 during which the selected title is decrypted. During a "Render Content" block 522, the selected title decrypted during block 520 is rendered. Finally, in an "End Render Content" block 529, process 500 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method for decrypting media content, comprising:
    receiving a request to render a first item of media content,
        wherein the first item of media content is associated with a first storage partition and a first title key, and
        wherein the first storage partition is associated with a second item of media content, a first management key block (MKB), a first binding ID (IDb) and a first authorization table (AT);
    calculating a first current MKB, a first current IDb and a first current AT;
    determining when the first MKB, the first IDb and the first AT match the first current MKB, the first current IDb and the first current AT, respectively; and
    when the first MKB does not match the first current MKB, the first IDb does not match the first current IDB or the first AT does not match to the first current AT, generating a second storage partition, the generating comprising:
        rebinding the first item of media content with respect to the first current MKB, the first current IDb and the first current AT to generate a second title key;
        associating the first item of media content, the first current MKB, the first current IDb, the first current AT and the second title key with the second storage partition; and
        disassociating the first item of media content from the first title key, the first MKB, the first IDb, the first AT and the first storage partition;
        wherein the second item of media content remains associated with the first MKB, the first IDb, the first AT and the first storage partition.

2. The method of claim 1, further comprising:
    decrypting the first item of media content with the first title key when the first MKB matches the first current MKB, the first IDb matches the first current IDb and the first AT matches the first current AT;
    decrypting the first item of media content with the second title key when the first MKB does not match the first current MKB, the first IDb does not match the first current IDb or the first AT does not match the first current AT;
    and rendering the decrypted first item of media content.

3. The method of claim 1, further comprising:
receiving a request to render the second item of media content;
calculating a second current MKB, a second current IDb and a second current AT;
comparing the first current MKB to the second current MKB, the first current IDb to the second current IDb and the first current AT to the second current AT;
when the second current MKB does not match the first current MKB, the second current IDb does not match the first current IDb or the second current AT does not match the first current AT, generating a third storage partition, the generating of the third partition comprising:
rebinding the second item of media content with respect to the second current MKB, the second current IDb and the second current AT to generate a third title key;
associating the second item of media content, the second current MKB, the second current IDb, the second current AT and the third title key with the third storage partition; and
disassociating the second item of media content from the first MKB, the first IDB, the first AT and the first storage partition.

4. The method of claim 3, further comprising:
determining when an item of media content remains associated with the first storage partition; and
when determined that no item of media content is associated with the first storage partition, freeing resources associated with the first storage partition.

5. The method of claim 1, further comprising:
determining there is a dependency between the first and second items of media content; and
when the first item of media content is associated with the second partition, rebinding the second item of media content with respect to the first current MKB, the first current IDb and the first current AT to generate a third title key;
associating the second item of media content, the first current MKB, the first current IDb, the first current AT and the third title key with the second storage partition; and
disassociating the second item of media content from the first MKB, the first IDb, the first AT and the first storage partition.

6. The method of claim 1, wherein the items of media content are video files.

7. The method of claim 1, wherein the items of media content are audio files.

8. A system for decrypting media content, comprising:
a processor;
a memory coupled to the processor; and
logic, stored on the memory and executed on the processor, for:
receiving a request to render a first item of media content,
wherein the first item of media content is associated with a first storage partition and a first title key, and
wherein the first storage partition is associated with a second item of media content, a first management key block (MKB), a first binding ID (IDb) and a first authorization table (AT);
calculating a first current MKB, a first current IDb and a first current AT;
determining when the first MKB, the first IDb and the first AT match the first current MKB, the first current and the first current AT, respectively; and
when the first MKB does not match the first current MKB, the first IDb does not match the first current IDB or the first AT does not match the first current AT, generating a second storage partition, the generating comprising:
rebinding the first item of media content with respect to the first current MKB, the first current IDb and the first current AT to generate a second title key;
associating the first item of media content, the first current MKB, the first current IDb, the first current AT and the second title key with the second storage partition; and
disassociating the first item of media content from the first title key, the first MKB, the first IDb, the first AT and the first storage partition;
wherein the second item of media content remains associated with the first MKB, the first IDb, the first AT and the first storage partition.

9. The system of claim 8, the logic further comprising logic for:
decrypting the first item of media content with the first title key when the first MKB matches the first current MKB, the first IDb matches the first current IDb and the first AT matches the first current AT;
decrypting the first item of media content with the second title key when the first MKB does not match the first current MKB, the first IDb does not match the first current IDb or the first AT does not match the first current AT;
and rendering the decrypted first item of media content.

10. The system of claim 8, the logic further comprising logic for:
receiving a request to render the second item of media content;
calculating a second current MKB, a second current IDb and a second current AT;
comparing the first current MKB to the second current MKB, the first current IDb to the second current IDb and the first current AT to the second current AT;
when the second current MKB does not match the first current MKB, the second current IDb does not match the first current IDb or the second current AT does not match the first current AT, generating a third storage partition, the generating of the third partition comprising:
rebinding the second item of media content with respect to the second current MKB, the second current IDb and the second current AT to generate a third title key;
associating the second item of media content, the second current MKB, the second current IDb, the second current AT and the third title key with the third storage partition; and
disassociating the second item of media content from the first MKB, the first IDB, the first AT and the first storage partition.

11. The system of claim 10, the logic further comprising logic for:
determining when any item of media content remains associated with the first storage partition; and
when determined that no item of media content is associated with the first storage partition, freeing resources associated with the first storage partition.

12. The system of claim 8, the logic further comprising logic for:
determining there is a dependency between the first and second items of media content; and
when the first item of media content is associated with the second partition, rebinding the second item of media content with respect to the first current MKB, the first current IDb and the first current AT to generate a third title key;

associating the second item of media content, the first current MKB, the first current IDb, the first current AT and the third title key with the second storage partition; and disassociating the second item of media content from the first MKB, the first IDb, the first AT and the first storage partition.

13. The system of claim 8, wherein the items of media content are video files.

14. The system of claim 8, wherein the items of media content are audio files.

15. A computer programming product for decrypting media content, comprising:

a memory; and logic, stored on the memory for execution on a processor, for:

receiving a request to render a first item of media content, wherein the first item of media content is associated with a first storage partition and a first title key, and wherein the first storage partition is associated with a second item of media content, a first management key block (MKB), a first binding ID (IDb) and a first authorization table (AT);

calculating a first current MKB, a first current IDb and a first current AT;

determining when the first MKB, the first IDb and the first AT match the first current MKB, the first current IDb and the first current AT, respectively; and when the first MKB does not match the first current MKB, the first IDb does not match the first current IDB or the first AT does not match to the first current AT, generating a second storage partition, the generating comprising:

rebinding the first item of media content with respect to the first current MKB, the first current IDb and the first current AT to generate a second title key;

associating the first item of media content, the first current MKB, the first current IDb, the first current AT and the second title key with the second storage partition; and disassociating the first item of media content from the first title key, the first MKB, the first IDb, the first AT and the first storage partition;

wherein the second item of media content remains associated with the first MKB, the first IDb, the first AT and the first storage partition.

16. The computer programming product of claim 15, the logic further comprising logic for:

decrypting the first item of media content with the first title key when the first MKB matches the first current MKB, the first IDb matches the first current IDb and the first AT matches the first current AT;

decrypting the first item of media content with the second title key when the first MKB does not match the first current MKB, the first IDb does not match the first current IDb or the first AT does not match the first current AT;

and rendering the decrypted first item of media content.

17. The computer programming product of claim 15, the logic further comprising logic for:

receiving a request to render the second item of media content;

calculating a second current MKB, a second current IDb and a second current AT;

comparing the first current MKB to the second current MKB, the first current IDb to the second current IDb and the first current AT to the second current AT;

when the second current MKB does not match the first current MKB, the second current IDb does not match the first current IDb or the second current AT does not match the first current AT, generating a third storage partition, the generating of the third partition comprising:

rebinding the second item of media content with respect to the second current MKB, the second current IDb and the second current AT to generate a third title key;

associating the second item of media content, the second current MKB, the second current IDb, the second current AT and the third title key with the third storage partition; and disassociating the second item of media content from the first MKB, the first IDB, the first AT and the first storage partition.

18. The computer programming product of claim 17, the logic further comprising logic for:

determining when any item of media content remains associated with the first storage partition; and when determined that no item of media content is associated with the first storage partition, freeing resources associated with the first storage partition.

19. The computer programming product of claim 15, the logic further comprising logic for:

determining there is a dependency between the first and second items of media content; and when the first item of media content is associated with the second partition, rebinding the second item of media content with respect to the first current MKB, the first current IDb and the first current AT to generate a third title key;

associating the second item of media content, the first current MKB, the first current IDb, the first current AT and the third title key with the second storage partition; and disassociating the second item of media content from the first MKB, the first IDb, the first AT and the first storage partition.

20. The computer programming product of claim 8, wherein the items of media content are one of video files or audio files.

21. The method of claim 1, wherein the generating of the second partition is in response to the a determination that the first MKB does not match the first current MKB, the first IDb does not match the first current IDB or the first AT does not match the first current AT.

22. The system of claim 8, wherein the generating of the second partition is in response to the a determination that the first MKB does not match the first current MKB, the first IDb does not match the first current IDB or the first AT does not match the first current AT.

23. The computer programming product of claim 15, wherein the generating of the second partition is in response to the a determination that the first MKB does not match the first current MKB, the first IDb does not match the first current IDB or the first AT does not match the first current AT.

* * * * *